March 20, 1962  O. B. SHERMAN  3,025,567
METHOD AND APPARATUS FOR LOW PRESSURE MOLDING
Filed Aug. 19, 1957  2 Sheets-Sheet 1

INVENTOR.
ORVILLE B. SHERMAN
BY Leonard D. Donbier
W. A. Schaich
ATTORNEYS

March 20, 1962  O. B. SHERMAN  3,025,567
METHOD AND APPARATUS FOR LOW PRESSURE MOLDING
Filed Aug. 19, 1957  2 Sheets-Sheet 2

INVENTOR.
ORVILLE B. SHERMAN
BY
ATTORNEYS

United States Patent Office 3,025,567
Patented Mar. 20, 1962

3,025,567
METHOD AND APPARATUS FOR LOW PRESSURE MOLDING
Orville B. Sherman, Toledo, Ohio, assignor to Owens-Illinois Glass Company, a corporation of Ohio
Filed Aug. 19, 1957, Ser. No. 678,941
7 Claims. (Cl. 18—30)

This invention relates to a method and apparatus for molding plastic materials into predetermined shapes through the utilization of lower pressures than have heretofore been deemed to be practical.

In the usual pressure molding of plastic materials, the material is injected into mold cavity through a highly restricted port and under extremely high pressures on the order of from 12,000–30,000 p.s.i. Such high pressure injection molding required bulky, expensive machinery to develop the required pressures and further made it necessary to have molds which are locked into closed position in a manner capable of resisting such high pressures which requires that the mold surfaces must be matched in extremely fine matching areas in order to obviate the formation of flash at the mold faces.

The restricted port was believed necessary to accomplish proper severing of the formed article from the remaining materials and to promote homogeneity of the plastic. At the same time, the restricted port greatly increased the pressure required to force the plastic quickly through such port to minimize the molding cycle time.

Also, in normal pressure molding, it is customary to inject material under high pressure through the above-mentioned small or restricted port or sprue opening and to then sever the sprue or runner either at the time of injection or at a period subsequent to the removal of the molded article from the mold, with the consequent necessity of regrinding the material forming the sprue or runner to avoid excessive waste of material.

In this present invention it is contemplated to extrude a measured quantity of heated organic molding material, exactly sufficient to form the desired article, into a chamber and to then eject this measured amount of material from the said chamber into a mold through an enlarged or unrestricted opening, at a substantially reduced pressure and without forming a sprue or runner.

Most organic materials are preferably molded at a temperature in the neighborhood of 350° F. All of the mechanisms contacting the moldable material will necessarily be heated. Consequently, the heated material will inherently tend to adhere to the metal members contacting it, particularly the ejection piston, and, to overcome this problem, this invention provides a free spacer member for deposit between the plastic material and the ejecting member to prevent sticking or adhesion between the plastic material and the ejecting member. In this manner, the plastic material enters the mold and is shaped therein with the spacer member attached thereto and the mold can immediately be separated from the ejection piston and the molding cycle repeated with a second mold.

Among the objects of this invention, the primary object is to provide an improved method and apparatus for molding plastic articles permitting the use of substantially lower pressures in the molding of heated plastic materials. Another object of this invention is to provide a plastic molding method and apparatus permitting the filling of molds through large area orifices. A further object is to segregate measured amounts of moldable plastic material from a source of supply by a segregating spacer member adapted to enter the mold and remain with the molded material for a predetermined time.

In the drawings:

FIG. 6 is a sectional elevation showing the mold opened, with the molded material and the insert member attached thereto; and FIG. 7 is a detailed sectional view illustrating the mechanism for moving the spacers successively into the segregation chamber.

Figure 1:
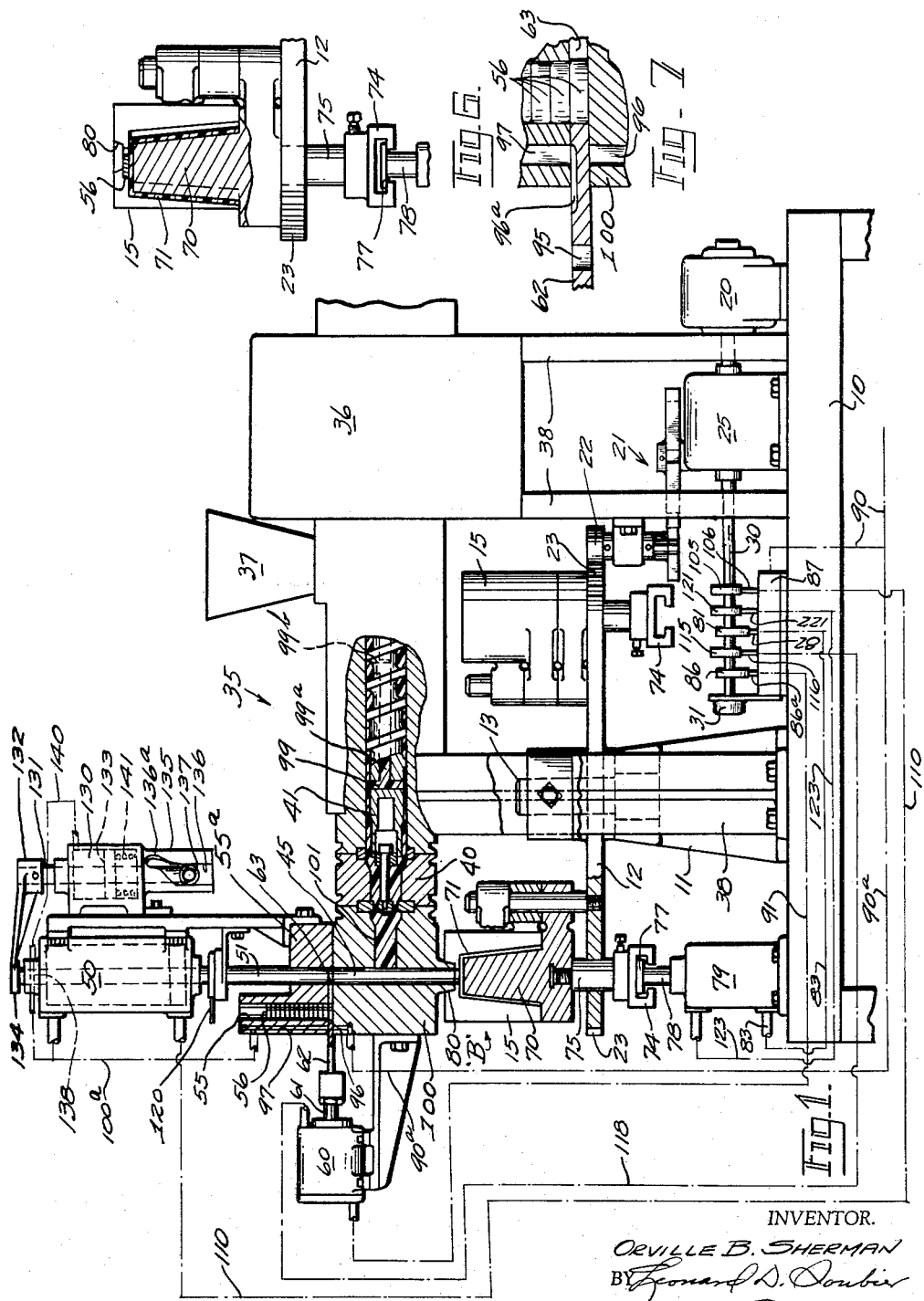
FIG. 1 is an elevation view, partly in section, illustrating an apparatus embodying this invention, including an extruder, segregating chamber and the molding machine.

Referring particularly to the drawings and specifically to FIG. 1, there is illustrated a base 10 upon which is mounted a vertical column 11 adapted to support a table 12 for rotation upon the vertical shaft 13. A series of molds 15 are mounted on the periphery of table 12 and adapted to be moved by said table through a closed path and to be brought thereby in succession to a molding station B.

A motor 20 is provided on said base and is adapted to drive a Geneva type drive mechanism 21 which in turn drives table 12 through a pinion 22 adapted to match with teeth 23 formed on the rim of table 12. Through this drive the molds 15 are brought in succession to the loading station B and each retained at that station for time sufficient to fill a mold with palstic material and then be moved to a discharging position. A gear reduction unit 25 is provided between the motor 20 and the Geneva drive in order to provide the proper speed for the drive mechanism. In addition, this gear reducing unit provides proper speed for the driving of cam control shaft 30 which extends out from the gear box 25 and is supported at its outer end in a bearing 31.

Also mounted on the base 10 is a unit 35 which is adapted to plasticize and extrude molding material. This unit is provided with a conventional driving means 36 (not shown in detail) and a hopper 37 through which powdered or granulated material for plasticizing is to be fed. Uprights 38 support the extruding unit 35 in a horizontal position extending outwardly over the center shaft 13 of the table 12. The extruder 35 is provided with a nozzle 40 which communicates with an inlet passage 101 in a segregating block 100. The block 100 also serves as an extrusion nozzle.

The extruder 35 is provided internally with a plasticizing member 41 adapted to force or eject a measured quantity of plasticized material outwardly along the center of the extruder through nozzle 40 and passage 101 to a vertical chamber 45 or passageway formed in the block 100. The detailed construction of extruder 35 is disclosed in my copending application Serial No. 636,559, now Patent No. 2,944,288, filed January 28, 1957. Mounted above the vertical passage 45 is an air motor 50 having a piston shaft 51 which reciprocated within the passage 45. Piston shaft 51 is constructed of low hysteresis magnetic material.

Positioned along side the piston 51 is a vertically disposed chamber 55 in a block 55a loaded with a vertical stack of spacers 56 which comprise discs of metal or other rigid material that is unaffected by the hot plastic material.

Mounted at one side of the nozzle 100 is a second air motor 60 having a horizontally disposed piston 61 which has mounted thereon a spacer pusher 62. This pusher is adapted to reciprocate into and out of a slot 63 for moving the inserts 56 in succession to a position in alignment with the top end of passage 45.

Each mold 15 on the table 12 is comprised pivotally mounted halves and is provided with an internally cooperating plunger 70, which is so shaped that when in cooperative position with the closed mold halves, it provides a mold cavity 71 therebetween for the reception of plastic molding material when the mold is brought to the loading station B. With the indexing of the table 12, a dependent yoke formation 74, attached to the mold plunger 70 by means of a shaft 75, is coupled with the T head 77 of a piston rod 78 forming a part of a vertical cylinder 79. When the mold comes to rest at the loading station B, the yoke member 74 is in alignment with and coupled to the T head 77 of the piston 78. The timer cam 81 and valve 82 then operate to pass air through line 83 to the cylinder 79, so that plunger 70 carrying the mold 15 with it is moved upwardly into aligned contact with the bottom face of block 100. The block 100 is formed with a tip or nozzle 80 which projects into a cavity of identical shape in the mold 15 defining a large area mold inlet passage 71a, FIG. 5, as explained in my copending application above identified.

With the mold parts in this position, the member 41 of the extruder will be moved outwardly causing a predetermined amount of plastic material 85 to be ejected into the vertical passage 45, such amount being selected to be precisely the amount required to form the article defined by mold 15. Concurrent with this described operation, a cam 86 on the timer cam shaft 30 will actuate a valve 86a in the valve chest 87, permitting pressured air from the main line 90 to pass through a conduit 91 to the rear end of cylinder 60. This application of pressure will cause the pusher 62 to move forward, moving a spacer 56 into alignment with both the passage 45 and the piston 51. As the pusher 62 reaches its forward position, it brings an opening 95 therein (FIG. 7) into alignment with passages 96 and 97 formed in the blocks 100 and 55a, thus permitting pressure air from line 90a to pass through to line 100a bringing air under pressure to the top end of cylinder 50 to thereby move the piston 51 and a spacer 56 downwardly through passage 45.

Preferably the spacers 56 are formed from a ferrous metal or are impregnated with ferrous particles. When a spacer 56 is fed to a position beneath the piston 51, a magnetizing device 120, such as a timer controlled solenoid, is activated to magnetize piston 51 and cause the spacer 56 to become attached to the lower end of the piston, thus placing it under positive control.

Figure 4:
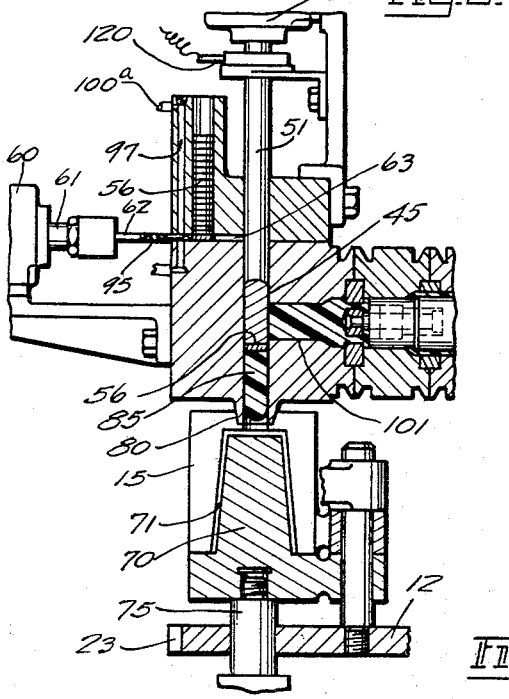
FIG. 4 is a view similar to FIG. 3, but showing the measured quantity of plastic material separated from the source of supply, with the spacer in contact with the plastic material which is on its way to the mold cavity.

As the spacer 56 is moved downward by piston 51, it contacts the measured quantity or mold charge of plastic material 85 which is now a preformed, substantially cylindrical or elongated body in chamber 45 and moves it bodily downward through the chamber 45, shearing it from the balance of the material in the extruder opening 101 (as shown in FIG. 4).

Figure 5:
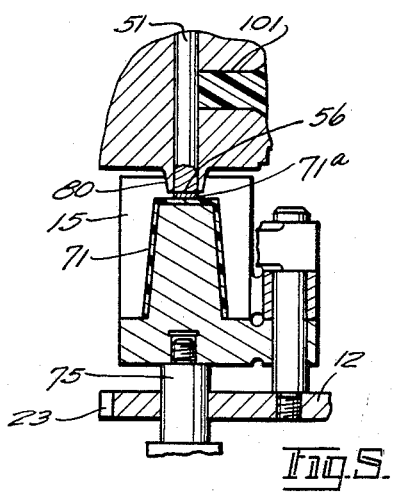
FIG. 5 is a partial sectional elevation illustrating the step where the mold is filled with plastic material and the spacer in position at one end of the mold cavity.

As the piston 51 continues its downward movement, it pushes the preformed mold charge of plastic material 85 downward through the large opening 71a into the cavity 71 in mold 15 as shown in FIG. 5. Owing to the size of the opening 71a, the full pressure of the piston 51 is transmitted to the plastic within the mold from the time the forward end of the charge enters the mold cavity until the entire charge has entered and been molded therein. This greatly reduces the molding time as compared with conventional methods wherein the plastic is forced through a restricted sprue opening into the mold. At the end of the down stroke of the piston 51, the spacer 56 will be within the confines of the mold 15, as shown in FIG. 5, but externally of the main mold cavity 71. In this position the spacer 56 forms a segment of the mold wall, the bottom surface of the segment serving to mold the surface portion of the plastic material in contact therewith.

Due to the fact that the plastic material is quite hot and the thin disc spacer 56 at a temperature near that of the plastic, the spacer 56 will inherently adhere to the shaped plastic in the mold 15. The motor 61 is then reversed, causing the pusher 62 to be retracted to the position shown in FIG. 7, thus bringing the channel 96a into a position to exhaust the pressure through line 100a and permit the piston 51 to be raised. The piston 51 is then demagnetized and is retracted and the spacer 56 will remain attached to the now formed plastic article. The piston 51 is retracted when a cam 105 actuates a valve 106 in the valve pack 87, permitting air to flow through line 110 to the lower end of the cylinder 50. At the same time, cam 115 will actuate the valve 116, permitting air to flow through line 118 at the front end of cylinder 60 to retract the pusher.

When the mold filling stroke of the piston rod 51, with its accompanying spacer 56, nears completion, it may be desirable in connection with the use of certain types of plastic materials, particularly when making thin walled articles, to give an extra impact to the end of said stroke to thereby permit flow of material into thinner walls than is possible with conventional methods. In order to accomplish this impact, a cylinder 130 is provided with a piston rod 131 carrying an impact arm 132 at its upper end and having a piston 133 attached thereto and disposed within the cylinder 130 (FIG. 1).

The impact arm 132 is provided at its outer end with an impact pad 134 adapted to contact the upper end of the piston rod 51. The lower end of cylinder 130 is provided with cylindrical sleeve 135 in which is formed a cam path 136. A cam roller 137 is attached to the lower end of piston rod 131 and is adapted to run in cam path 136. The cam path 136 is adapted to swing the impact arm 132 into and out of aligned contact with piston rod 51 at the end of the down stroke of piston rod 51 in order to give the desired impact to the rod 51, spacer 56 and the plastic material in the mold 15. As shown in FIG. 1 the impact pad 134 is in contact with the top end of the rod 51 due to the admission of pressure air from line 100a through opening 138 in the upper end of piston rod 51, to the line 140 and above the piston 133 of the cylinder 130.

Upon the return stroke of the pusher 62, the lines 140, 100a and 97 are disconnected from the pressure air, as shown in FIG. 7, and returned to exhaust through the passage 96a. With the discontinuing of this pressure the spring 141 in cylinder 130 raises the piston 133 and the portion 136a of cam path 136 through cam roll 137 swings the impact arm pad 134 out of alignment with the piston rod 51. From the preceding, it should be apparent that the impacting stroke is integrated into the stroke of the piston rod 51 thereby to insure not only the use of the impact but its use at the proper time.

With the completion of the molding operation, a cam 121 actuates a valve 122 in the valve pack 87 and permits air to flow through the line 123 to the top end of cylinder 79, retracting the mold 15 and plunger 70 from their cooperative position with the nozzle 80 and into a position of rest on the table 12. The Geneva drive then indexes the table 12 the angular distance between successive molds. This movement of table 12 will cause the attaching yoke 74 to move out of control with the T member 77 of the piston 78 and permit the next succeeding connecting yoke 74 to move into position and register with the T member 77 at the loading station B.

From the preceding, it should be apparent that a series of mechanical movements and molding operations are performed in successive and timed sequence with respect to each other. The timing of each operation is successively controlled by the series of cams mounted on the cam shaft 30.

The general operation of this mechanism is about as follows:

The member 41 of the extruder 35 is moved forward by mechanisms (not shown) to thereby eject a measured quantity of plastic material 85 from the extruder opening 101 into the vertical passageway 45. The movement of this member 41 not only ejects a measured amount of material, but shuts off or segregates the ejected material from the plasticizing source. The material then remaining in the plasticizer proper will then recirculate through the passages 99, 99a and 99b provided in the member 41 for that purpose.

With a mold charge of the material in the passage 45, the pusher 62 is moved forward causing a spacer 56 to be brought to a position beneath and in contact with the magnetized piston 51 and at the same time permitting air under pressure to pass through channels 95, 96, 97 and 100a to the upper end of the cylinder 50. This causes the piston 51, and the spacer 56 attached thereto by the action of the magnetizer 120, to be moved downward through the passage 45, shearing off the measured quantity of material 85 and extruding the same under low pressure into the mold cavity 71 in the mold 15. Such low pressure may be within the range of 500 to 3,000 p.s.i.

Figure 2:
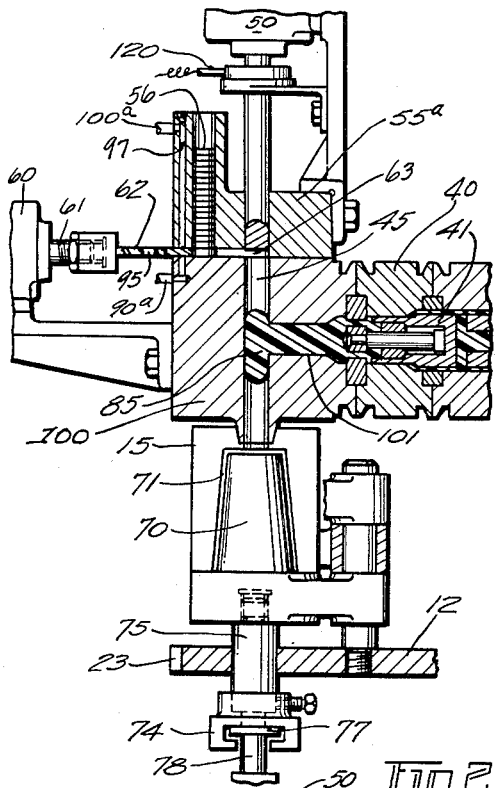
FIG. 2 is an enlarged scale, sectional elevation view illustrating the steps of the process where plastic material is extruded into the segregating chamber.
Figure 3:
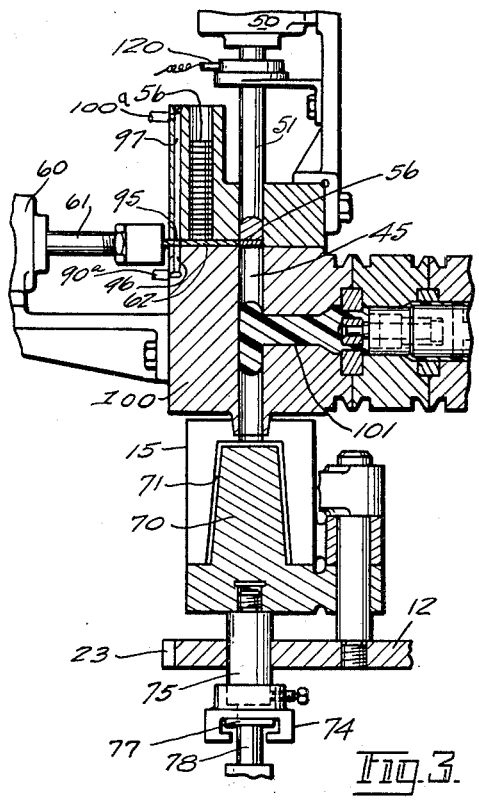
FIG. 3 is a view similar to FIG. 2, but illustrating the step where a spacer is positioned to segregate the measured amount of material from the source of supply.

It will be noted that the opening 71a in the mold 15 is an enlarged opening of the same size or cross-sectional area as that of the insert or mold charge entering the mold and is actually an extremely large opening when compared, for example, with the usual sprue openings utilized in normal high pressure injection molding procedure. Thus, the charge 85 may be very rapidly and easily pushed into the cavity 71 and at the tail end of the stroke of piston 51, only a low pressure will be applied to the material through the spacer 56. When the mold charge has been transferred thus to the mold, a cam 105 on the cam shaft actuates valve 106, causing the piston 51 to be retracted to its uppermost position as shown in FIG. 2, and simultaneously therewith, cam 121 actuates the valve 122 and causes the cylinder 79 to retract the mold plunger 70 and its encompassing mold 15 to a position at rest upon the table 12. When articles of extremely thin cross-sectional area are being produced by and through this low pressure method, it may be found expedient to impact the charge in the mold, particularly at the tail end of the molding operation. Such impacting is to insure the flow of the material throughout the total mold area and is accomplished by activating cylinder 130 to bring an impacting arm 134 into contact with the piston 51 when the latter has about reached the end of its molding stroke. With the completion of the molding operation, the table 12 is then indexed through the Geneva mechanism 21 to move mold 15, the molded article and its spacer 56 to a succeeding station where the plastic article and the spacer 56 will be removed from the machine. The spacer 56 will then be returned to the hopper 55 for reuse. The indexing of table 12 brings a succeeding mold 15 into aligned position beneath the extruder nozzle 100, preparatory to the next molding operation. These various operations above set forth will then be repeated in successive sequence to thereby produce a succession of molded articles.

It will be noted that the opening 71a and the spacers 56 are shown as being of about the same diameter and with that diameter being less than that of the smallest diameter of the molded article. However, it is contemplated that the diameter of the opening 71a and the inserts 56 may be preferably on the larger side in order to increase the ease with which the plastic material may be injected into the cavity 71. This method in which a large opening is provided for the material to enter the mold is completely contrary to the prevailing theory of utilizing extremely narrow slots of cross-sectional areas which require extremely high pressures for the injection of the material and with such high pressures also requiring that the molds and extruder mechanism be held together by other high pressure means in order to withstand the high pressures of the extruder or injection molding device.

By utilizing this low pressure method, it is not necessary to have any high pressure mechanisms to hold the molds closed and the normal finishing as between mold parts or faces may be utilized rather than having to resort to highly precise matching of parts which is absolutely necessary with high pressure molding.

Further, with this present method, molding pressures of low degree may be utilized and thus the primary cause for flash at the mold seams, etc., is obviated and, in addition, this particular method as disclosed herein, permits the making of a finished molded article with no sprues to be removed therefrom, either while the article is in the mold or upon its removal therefrom.

It is contemplated that the plastic molding materials to be utilized with this method and apparatus will be materials such as polyethylene, polystyrene or any other similar materials capable of being handled in the manner disclosed herein.

Modifications may be resorted to within the scope of the appended claims.

What I claim is:

1. In an apparatus for forming molded plastic articles, a plasticizer, an elongated supply chamber of constant cross-section communicating with said plasticizer, a mold having an opening communicating with one axial extremity of the chamber, said opening and said chamber being of substantially the same cross-sectional size and contour, a power displaceable piston having a pressure face of substantially the size and contour of the chamber cross-section and movable axially in said chamber from a retracted position to an extended position, the piston when retracted accommodating plasticizer-chamber communication and when extended interrupting plasticizer-chamber communication and displacing plasticized material through said chamber into said mold through said mold opening, means for depositing a spacer of substantially the size and contour of said piston pressure face intermediate said material and said piston when the piston is retracted, and power means for displacing said piston to advance the piston, the spacer and the material toward said mold and to retract the piston alone.

2. In an apparatus as defined in claim 1, means for magnetizing said piston face during its movement from its retracted position to its extended position, the spacer being metallic, and magnetically attracted and secured to said face, and means for demagnetizing said piston face prior to retraction of the piston.

3. In a method of making a plastic article, the steps of disposing a predetermined charge of plasticized material in a channel, positioning a disposable member in said channel in contact with said charge, advancing the charge and the member through said channel toward a mold having an opening communicating with said channel, filling the mold with said charge and closing said opening with said member, and subjecting the charge in the mold to a molding pressure transmitted thereto through said member, thereby forming the article with said member in situ.

4. In an apparatus for forming molded plastic articles, the combination of a plasticizer, a nozzle attached to and forming a part of said plasticizer, the nozzle being formed with an open, vertically disposed chamber extending therethrough, a conduit connecting said plasticizer and said chamber, a mold adapted to cooperate with and opening onto the bottom end of said chamber, a pressure device adapted to cooperate with the opposite end of said chamber, means to eject a measured quantity of plastic material from said plasticizer into said chamber, means to position a spacer in said chamber in alignment with said pressure device and interposed between said pressure device and said material, means to actuate said pressure device toward said mold to simultaneously deposit said spacer and material in said mold to thereby mold said material, and means to retract the pressure device only, thereby leaving only the spacer ahered to the material filling said mold.

5. In an apparatus for forming molded plastic articles, the combination of a plasticizing device, a nozzle attached to and forming a part of said plasticizer, an open chamber extending through said nozzle, said chamber being of like cross-section throughout its length, a conduit adapted to interconnect said plasticizer and said chamber, a mold adapted to cooperate with one end of said chamber, said mold provided with a material receiving opening, the cross-sectional area of said mold opening being equal to that of said chamber opening, a pressure device adapted to cooperate with and movable through said chamber, means to eject plastic material from said plasticizer and said conduit into said chamber, magnetically disposing an insert member on the end of said pressure member and between said material and said pressure device, and means to move said pressure device through said chamber to sever and deposit said insert and material in said mold.

6. The method which comprises introducing a mold charge of plastic molding material into a channel and thereby forming an elongated mold charge within the channel, advancing a plunger through said channel to move the mold charge bodily along the channel and through a charging opening into a mold cavity, said opening being in register with said channel and of substantially the same cross-sectional size and shape as the channel, whereby the forward end of the mold charge enters the mold cavity without substantial deformation of the mold charge, interposing a spacer between the plunger and the mold charge in the channel molding said charge within the mold cavity during its entrance thereinto and by a continuation of the said pressure, said pressure being applied by a plunger movable within and along said channel, positioning the spacer to close said opening at the completion of the molding operation and retracting the plunger.

7. Apparatus for molding an article consisting of a moldable plastic material, said apparatus comprising a mold formed with a mold cavity therein and an inlet opening extending through a wall of the mold into communication with said cavity, an extruder comprising a nozzle formed with a channel extending therethrough, said channel being in register with said inlet opening, said nozzle formed with a passageway therethrough communicating with said channel and through which the plastic material is extruded from a supply body into the channel, the said inlet opening being of substantially the same cross-sectional area as the channel, a plunger mounted for reciprocating movement within said channel and operable to move a charge of material in the channel through said opening into the mold cavity to mold the material within said cavity by pressure applied through said plunger, said plunger including a spacer in the form of a disk, means for depositing the spacer into the channel between the plunger and the said material therein, magnetizing said plunger to retain said disk, transmitting the pressure supplied by the plunger through said spacer and moving the latter through said channel into position to close said inlet opening and demagnetizing said plunger.

References Cited in the file of this patent

UNITED STATES PATENTS

| | | |
|---|---|---|
| 1,760,234 | Frederick | May 27, 1930 |
| 2,076,315 | Albrecht | Apr. 6, 1937 |
| 2,232,104 | Ernst | Feb. 18, 1941 |
| 2,327,227 | Tucker | Aug. 17, 1943 |
| 2,592,768 | Van der Pyl | Apr. 15, 1952 |
| 2,728,453 | Thweatt et al. | Dec. 27, 1955 |
| 2,746,089 | Hendry | May 22, 1956 |

OTHER REFERENCES

Noftsinger: abstract of application Serial No. 697,592, published April 3, 1951, 645 O. G. 328.